2,780,644

Patented Feb. 5, 1957

2,780,644

PROCESS FOR RECOVERY OF COMPLEX ESTER SYNTHETIC LUBRICANTS FROM ALUMINA ADSORBENTS

Harold R. Ready, Roselle Park, N. J., assignor to Esso Research and Engineering Company, a corporation of Delaware No Drawing. Application December 28, 1953, Serial No. 400,786

9 Claims. (Cl. 260—485)

This invention relates to synthetic lubricating compositions, and particularly to a process for their recovery. More particularly the invention relates to a process for the recovery of ester type synthetic lubricants from alumina used to reduce the corrosivity of said esters.

In copending application, Serial No. 394,883, filed November 27, 1953, there is described a process for the reduction of corrosivity of ester type synthetic lubricants which comprises filtering the finished ester through, or contacting the ester with, an activated alumina of particular composition and particle size. The disclosure of this copending application is hereby incorporated and made a part hereof. Generally speaking, the process of said copending application comprises the steps of maintaining in intimate admixture with the synthetic ester material an activated particulated alumina of a particle size of between about 2.362 and about 0.147 millimeters, having a sodium oxide content of about 0.5 to about 1.5 weight percent, and having an adsorptivity, based on the weight of water adsorbed, of between about 10.0% and about 18.0%. The contacting may be accomplished in a batch slurry technique, in which case a mixture of the synthetic material and about 0.1% to about 7.0% of the alumina is heated to a temperature between room temperature and about 150° F. for from about one-half to three hours. The treated oil is then filtered to remove the alumina particles. It may also be desirable to use a percolation type treatment instead of the batch slurry method. The percolation technique is cheaper, more efficient, and lends itself more readily to plant production. When percolation technique is used, a packed column of alumina is used and its dimensions depend upon the particulate size of the alumina, the flow rates desired, and the corrosivity of the product being treated.

When either the batch slurry technique or the percolation technique is used to reduce the corrosivity of the synthetic lubricant, a certain amount of the treated product adheres to the alumina causing a decrease in yield of the desired product. This adherence may amount to as much as 7 to 10% of the product being treated.

It has now been found, and forms the object of this invention, that certain organic solvents will selectively desorb the adsorbed synthetic ester material from the spent alumina. That is to say, certain of the solvents for the synthetic ester material will desorb, or solvate, only the non-corrosive portion of the adsorbed material, leaving still adsorbed on the alumina particles the harmful corrosive material. This discovery is surprising and is completely unexpected.

It has been found, for example, that paraffinic hydrocarbon solvents having from about 6 to 16 carbon atoms such as hexane, heptane, octane, nonane, decane or mixtures of these solvents will remove the portion of the adsorbed synthetic ester material from the alumina particles that is less corrosive, leaving still adsorbed on the particles the more harmful, more corrosive portion of the adsorbed synthetic ester material. Other solvents for the esters, such as acetone, isopropyl alcohol, and the like, completely remove the adsorbed ester, including the corrosive portion, and thus are undesirable.

The treatment is carried out at a temperature of from about room temperature to about 150° F. and for a period of from about ½ to about 3 hours. Intimate contacting is maintained between the paraffinic hydrocarbon and the alumina during the treating period by methods known to the art. Ordinarily from about 1 to 3 volumes of the solvent per volume of alumina is used.

The invention will be more clearly explained by reference to the following examples.

EXAMPLE 1

A complex ester synthetic lubricant was prepared by reacting together two moles of sebacic acid, two moles of 2-ethylhexanol, and one mol of polyethylene glycol having a molecular weight of about 200. The procedure used was as follows:

In a 10-gallon Pfaudler reactor are placed 9 lbs. of polyethylene glycol 200, 20 lbs. of sebacic acid and 5 lbs. of toluene. Sodium bisulfate catalyst (46 g.) is added and the mixture refluxed until water ceases to distill. After removing the toluene as completely as possible by distillation, 18 lbs. of 2-ethylhexanol is added to the reactor and esterification contiued until reaction is essentially complete. Each esterification step requires from 2 to 4 hours. The ester is then heated at 450° F. at about 10 to 15 mm. pressure for 3 to 4 hours. After cooling the product is filtered and washed first with alkali and then twice with water in order to remove most of the acidic impurities. The final product is isolated by stripping off the washing solvent at 250° F./15 mm. Yields of about 90% are obtained in this manner.

A complex ester synthetic lubricant prepared as described above had the following properties:

| | |
|---|---:|
| Viscosity at 210° F _____ cs__ | 10.5 |
| Viscosity at 100° F _____ cs__ | 54.5 |
| Viscosity at —40° F _____ cs__ | 24,500 |
| Flash point _____ °F__ | 480 |
| Pour point _____ °F__ | —60 |
| Acid number (mg. KOH/gm.) _____ | 0.25 |
| Lead corrosion [1] (mg. wt. loss) _____ | 75 |

[1] A weighed piece of lead is affixed to a stainless steel shaft and immersed in a sample of the test oil. A piece of copper of comparable size is affixed to the same shaft to act as a catalyst. Air is bubbled through the test sample to insure an oxidizing atmosphere. The sample is heated for one hour at 325° F. After the test period the sample of lead is washed with heptane and the loss in weight recorded. Loss in weight is directly proportional to the corrosiveness of the test oil.

This complex synthetic ester lubricating oil was divided into five portions. The portions were treated as follows:

A. The first portion was percolated through a packed column of alumina particles having a particle size of from 8 to 14 mesh, i. e., from 2.362 to 1.168 mm. The column was 3" in diameter and was 30" high.

B–E. The second, third, fourth and fifth portions were admixed with about 5 wt. percent of a particulated alumina having a particle size of from 48 to 100 mesh, i. e., from .295 to .147 mm. The contact was maintained with agitation for about 2 hours at a temperature of about 75° F. The treated product was then filtered to remove the alumina.

After the above detailed treatment, the product recovered had the following properties:

| | A | B | C | D | E |
|---|---:|---:|---:|---:|---:|
| Viscosity at 210° F | 10.5 | 10.5 | 10.5 | 10.5 | 10.5 |
| Viscosity at 100° F | 54.5 | 54.5 | 54.5 | 54.5 | 54.5 |
| Viscosity at —40° F | 24,400 | 24,100 | 24,100 | 24,100 | 24,100 |
| Flash Point, °F | 480 | 480 | 480 | 480 | 480 |
| Pour Point, °F | —60 | —60 | —60 | —60 | —60 |
| Lead Corrosion (mg. wt. loss) | —20 | —14 | —11 | —11 | —12 |
| Acid Number (mg. KOH/gm.) | 0.19 | 0.15 | 0.13 | 0.13 | 0.14 |
| Yield (percent) | 88 | 85 | 85 | 85 | 85 |

After the treating step, the alumina used to adsorb the corrosive portion of the synthetic lubricant was treated with a solvent to remove the adsorbed, or occluded, ester. The alumina in the percolation column was washed with heptane. The alumina filtered from portions B, C, D and E was contacted respectively with about one volume of heptane, one volume of hexane, one volume of a mixture of paraffinic hydrocarbon solvents ranging from $C_{11}$ to $C_{14}$ carbon atoms and one volume of acetone for about one-half hour at about 85° F. Intimate contacting was maintained by stirring. The solutions obtained were then distilled up to 250° F./20 mm. to remove the solvent. Data on the recovered ester are set out in Table I below.

*Table I*

RECOVERY OF ADSORBED ESTER FROM SPENT ALUMINA

| | A | B | C | D | E |
|---|---|---|---|---|---|
| Solvent | Heptane | Heptane | Hexane | C11–C14 Mixture | Acetone. |
| Yield (percent on spent alumina) | 15 | 21 | 21 | 25 | 25. |
| Particle size of alumina, mm | 8–14 (2.362–1.168) | 48–100 (.295–.147) | 48–100 (.295–.147) | 48–100 (.295–.147) | 48–100 (.295–.147). |
| Contacting method | Percolation | Slurry | Slurry | Slurry | Slurry. |
| Viscosity at 210° F., cs | 7.72 | 6.44 | 9.09 | 12.31 | 9.71. |
| Sulfated ash (percent) | None | None | None | None | 0.012. |
| Acid No. (mg. KOH/gm.) | 0.2 | 0.3 | 0.12 | | 0.4. |
| Lead corrosion (mg. wt. loss) | 40 | 46 | 20 | 15 | 272. |

An examination of the data of Table I above will point out the advantage of the process of the instant invention. It will be noted that the yield and viscosity of the acetone reclaimed ester material is considerably higher than when a paraffinic solvent is used, indicating the higher degree of recovery with the acetone. It will also be noted that this increased yield is undesirable when the acid numbers and the lead corrosion values of the acetone extract is compared with the heptane extract. The undesirably high lead corrosion value of the acetone extract indicates that more of the highly corrosive material is extracted by acetone, but is not desorbed or extracted when a paraffinic solvent is used.

To summarize briefly, the instant invention is directed to the surprising discovery that $C_6$–$C_{16}$ paraffinic hydrocarbon solvent will selectively desorb synthetic ester material of low corrosivity from alumina used to reduce the corrosiveness of synthetic lubricants of the ester type. This selective desorption is desirable since the reclaimed material is thus lower in lead corrosion properties and can be used without further substantial treatment.

What is claimed is:

1. In a process for the reduction of the corrosivity of synthetic ester materials useful as synthetic lubricants which comprises the steps of maintaining an intimate contact with said synthetic ester material an activated particulated alumina and filtering said alumina from said treated materials, the improvement which comprises treating said filtered alumina with a paraffinic hydrocarbon solvent containing from 6 to 16 carbon atoms to selectively desorb ester material of lower corrosivity, and distilling said solvent to recover said extracted ester material.

2. An improved process according to claim 1 wherein said synthetic ester material is a complex ester formed by reacting a dibasic acid, a glycol, and a branched chain alcohol.

3. An improved process according to claim 1 wherein said treatment is carried out at about room temperature to about 150° F. for about one-half to about three hours.

4. An improved process according to claim 1 wherein said paraffinic hydrocarbon solvent is heptane.

5. An improved process according to claim 1 wherein said paraffinic hydrocarbon solvent is a mixture of $C_{11}$ to $C_{14}$ paraffinic hydrocarbon solvents.

6. An improved process according to claim 1 wherein said paraffinic hydrocarbon solvent is hexane.

7. In a process for the reduction of the corrosivity of synthetic ester materials useful as synthetic lubricants which comprises the steps of maintaining in intimate contact with said synthetic ester material an activated particulated alumina and filtering said treated materials, the improvement which comprises treating said filtered alumina with about one volume of hexane at about 85° F. for about one-half hour to selectively desorb synthetic ester material of lower corrosivity, and distilling said mixture to recover said desorbed ester material.

8. In a process for the reduction of the corrosivity of synthetic ester materials useful as synthetic lubricants which comprises the steps of maintaining in intimate contact with said synthetic ester material an activated particulated alumina and filtering said treated materials, the improvement which comprises treating said filtered alumina with about one volume of a mixture of $C_{11}$ to $C_{14}$ paraffinic hydrocarbon solvents at about 85° F. for about one-half hour to selectively desorb synthetic ester material of lower corrosivity, and distilling said mixture to recover said desorbed ester material.

9. In a process for the reduction of the corrosivity of synthetic ester materials useful as synthetic lubricants which comprises the steps of maintaining in intimate contact with said synthetic ester material an activated particulated alumina and filtering said treated materials, the improvement which comprises treating said filtered alumina with about one volume of heptane at about 85° F. for about one-half hour to selectively desorb synthetic ester material of lower corrosivity, and distilling said mixture to recover said desorbed ester material.

References Cited in the file of this patent

UNITED STATES PATENTS

| | | |
|---|---|---|
| 2,572,433 | Bergstromm | Oct. 23, 1951 |
| 2,642,389 | Cohen et al. | June 16, 1953 |
| 2,668,848 | Neuworth | Feb. 9, 1954 |